United States Patent
Segall et al.

(10) Patent No.: US 8,014,445 B2
(45) Date of Patent: Sep. 6, 2011

(54) METHODS AND SYSTEMS FOR HIGH DYNAMIC RANGE VIDEO CODING

(75) Inventors: Christopher A. Segall, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1596 days.

(21) Appl. No.: 11/362,571

(22) Filed: Feb. 24, 2006

(65) Prior Publication Data

US 2007/0201560 A1    Aug. 30, 2007

(51) Int. Cl.
*H04N 7/12* (2006.01)
(52) U.S. Cl. .................................. 375/240.01
(58) Field of Classification Search ............ 375/240.01, 375/240.03, 240.16, 240.22, 240.25, 243, 375/245; 348/451, 452
See application file for complete search history.

(56) References Cited

U.S. PATENT DOCUMENTS

| | | |
|---|---|---|
| 5,500,677 A | 3/1996 | Fert et al. |
| 5,603,012 A | 2/1997 | Sotheran |
| 5,777,678 A | 7/1998 | Ogata et al. |
| 5,832,120 A | 11/1998 | Prabhakar et al. |
| 5,930,397 A | 7/1999 | Tsujii et al. |
| 6,057,884 A | 5/2000 | Chen et al. |
| 6,396,422 B1 | 5/2002 | Barkan |
| 6,400,996 B1 | 6/2002 | Hoffberg et al. |
| 6,490,320 B1 | 12/2002 | Vetro |
| 6,493,386 B1 | 12/2002 | Vetro |
| 6,574,279 B1 | 6/2003 | Vetro |
| 6,748,020 B1 | 6/2004 | Eifrig et al. |
| 6,765,931 B1 | 7/2004 | Rabenko |
| 6,795,501 B1 | 9/2004 | Zhu |
| 6,829,301 B1 | 12/2004 | Tinker et al. |
| 6,850,252 B1 | 2/2005 | Hoffberg |
| 6,867,717 B1 | 3/2005 | Ion et al. |
| 6,879,731 B2 | 4/2005 | Kang et al. |
| 6,895,052 B2 | 5/2005 | Hanamura et al. |
| 6,968,007 B2 | 11/2005 | Barrau |
| 6,996,173 B2 | 2/2006 | Wu |
| 7,006,881 B1 | 2/2006 | Hoffberg et al. |
| 7,010,174 B2 | 3/2006 | Kang et al. |
| 2002/0054638 A1 | 5/2002 | Hanamura |

(Continued)

FOREIGN PATENT DOCUMENTS

EP           0644695           3/1995

(Continued)

OTHER PUBLICATIONS

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.

(Continued)

*Primary Examiner* — Young T. Tse
(74) *Attorney, Agent, or Firm* — Chernoff, Vilhauer, McClung & Stenzel (57) ABSTRACT

Embodiments of the present invention comprise methods and systems for high dynamic range (HDR) video coding and decoding that is backwards-compatible with one or more standard dynamic range (SDR) encoding and decoding techniques, through the transmission of HDR residual data used to reconstruct an encoded HDR sequence from an inverse-tone-mapped SDR sequence.

7 Claims, 7 Drawing Sheets

U.S. PATENT DOCUMENTS

| | | |
|---|---|---|
| 2003/0035488 A1 | 2/2003 | Barrau |
| 2003/0043908 A1 | 3/2003 | Gao |
| 2003/0112863 A1 | 6/2003 | Demos |
| 2003/0194007 A1 | 10/2003 | Chen |
| 2004/0001547 A1 | 1/2004 | Mukherjee |
| 2004/0151249 A1 | 8/2004 | Morel |
| 2005/0013501 A1 | 1/2005 | Kang et al. |
| 2005/0030315 A1 | 2/2005 | Cohen et al. |
| 2005/0147163 A1 | 7/2005 | Li |
| 2006/0002611 A1 | 1/2006 | Mantiuk et al. |
| 2006/0077405 A1 | 4/2006 | Topfer et al. |
| 2006/0083303 A1 | 4/2006 | Han et al. |
| 2006/0126962 A1 | 6/2006 | Sun |
| 2006/0153294 A1 | 7/2006 | Wang et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0209959 A1 | 9/2006 | Sun |
| 2006/0210185 A1 | 9/2006 | Sun |
| 2006/0221760 A1 | 10/2006 | Chen |
| 2006/0251330 A1 | 11/2006 | Toth et al. |
| 2007/0201560 A1 | 4/2007 | Segall |
| 2007/0140354 A1 | 6/2007 | Sun |
| 2007/0160133 A1 | 7/2007 | Bao et al. |
| 2008/0192819 A1* | 8/2008 | Ward et al. ............... 375/240.02 |

FOREIGN PATENT DOCUMENTS

| | | |
|---|---|---|
| EP | 0966162 | 12/1999 |
| EP | 1170954 A1 | 1/2002 |
| EP | 1195992 A1 | 4/2002 |
| EP | 1248466 A1 | 10/2002 |
| JP | 2005-056271 | 3/1993 |
| JP | 7162870 | 6/1995 |
| JP | 9070044 | 3/1997 |
| JP | 9182085 | 7/1997 |
| JP | 1018085 | 1/1999 |
| JP | 11331613 | 11/1999 |
| JP | 2000184337 | 6/2000 |
| JP | 2004-363931 | 12/2004 |
| JP | 2005-080153 | 3/2005 |
| JP | 2005-094054 | 4/2005 |
| JP | 2005-167431 | 6/2005 |
| WO | WO 2005/104035 | 11/2005 |

OTHER PUBLICATIONS

Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201; 22$^{nd}$ Meeting: Marrakech, Morocco, Jan. 13-19, 2007.
International Search Report for PCT/JP2008/054687.
Joint Video Team (JVT) of ISO/IEC MPEG & ITU-T VCEG,Advanced video coding for generic audiovisual services, ISO/IEC 14496-10, JVT-T201, Austria, Jul. 2006.
International Telecommunication Union, Series H: Audiovisual and Multimedia Systems; Coding of Moving Video; H.264, Mar. 2005.
Internation Telecommunication Union, ISO/IEC 13818-2 MPEG-2, Geneva, 1995.
International Organisation for Standardisation, MPEG-4 Version 2 Visual Working Draft Rev 5.0, Atlantic City, Oct. 1998.
International Telecommunication Union, Series H: Audiovisual and Multimedia Systems; Video coding for low bit rate communication; H.263, Geneva, Jan. 2005.
Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, p. 134-135.
PCT/JP2007/064040 International Search Report.
Office action dated Sep. 3, 2008 for U.S. Appl. No. 11/776,430.
F. Durand and J. Dorsey, "Fast Bilateral Filtering for the Display of High-Dynamic-Range Images", Proceedings of SIGGRAPH, San Antonio, TX, Jul. 21-26, 2002.
R. Fattal, D. Lischinski and M. Werman, "Gradient Domian High Dynamic Range Compression", Proceedings of SIGGRAPG, San Antonio, TX, Jul. 21-26, 2002.
Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) 20$^{th}$ Meeting: Klagenfurt, Austria, Jul. 15-21, 2006, JVT-T061.
L. Meylan and S. Susstrunk, "High Dynamic Range Image Rendering with a Retinex-Based Adaptive Filter", IEEE Transactions on Image Processing, Sep. 2005.
S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.
E. Reinhard, M. Stark, P. Shirley and J. Ferwerda, "Photographic Tone Reproduction for Digital Images", Proceedings of SIGGRAPH, San Antonio, TX, Jul. 21-26, 2002.
G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.
International Search Report for International Application No. PCT/JP2007/050277.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.
Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 * section 8.4.2.2.1 *.
Julien Reichel, Heiko Schwarz and Mathias Wien, "Scalable Video Coding—Working Draft 4", JVT-Q201, Nice, FR, Oct. 2005.
Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.
R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.
H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.
H. Seetzen, G. Ward, and L. Whitehead, "High Dynamic Range Display Using Low and High Resolution Modulators," The Society for Information Display International Symposium, Baltimore, Maryland, May 2003.
G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.
Japanese Office Action dated Mar. 23, 2010, relating to Japanese Patent Application No. 2007-044489; 1 pg.
English Translation of Japanese Decision of Refusal (Office Action) dated Mar. 23, 2010; pp. 1-2.

* cited by examiner

METHODS AND SYSTEMS FOR HIGH DYNAMIC RANGE VIDEO CODING

FIELD OF THE INVENTION

Embodiments of the present invention comprise methods and systems for high dynamic range video coding.

BACKGROUND

High dynamic range displays provide a significant improvement over current display technology. These devices produce a peak brightness that is an order of magnitude larger than conventional technology and a dynamic range that approaches the capabilities of a human observer. Additionally, these devices provide an enlarged color gamut and can reduce the motion blur in an LCD system. The result is a compelling viewing experience that is easily differentiated from current display technology.

Unfortunately, current technology does not natively support high dynamic range content. These techniques are designed for current display technology and built on the assumption that high dynamic range content can not be reproduced and therefore should be discarded.

The direct extension of storage and distribution systems to support high dynamic range content is problematic. In the case of a digital scenario, a larger bit-depth for each pixel is required; for the case of an analog system, reduced noise is necessary. This results in a significant trade-off. Image quality of traditional, standard dynamic range displays must be decreased to accommodate the high dynamic range content. Consumers are unlikely to find this acceptable.

SUMMARY

Embodiments of the present invention comprise systems and methods for high dynamic range video coding.

Some embodiments comprise a method for compressing high dynamic range image sequences. Some embodiments comprise a layered approach that separates the original image frames into higher dynamic range and lower dynamic range components. Lower dynamic range portions of the sequence are then coded with a standards compliant codec, making the system backwards compatible with legacy devices. The higher dynamic range information is sent with an enhancement bit-stream. Standard dynamic range displays may only process and display the lower dynamic range portion. High dynamic range displays may receive the entire signal and reconstruct the original high dynamic range content for display. In many embodiments, the quality of the lower dynamic range content is not sacrificed by the addition of the high dynamic range information.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

High Dynamic Range Displays

High dynamic resolution (HDR) displays are designed to enlarge the dynamic range of a viewing device to better match the capabilities of a human observer. For example, traditional displays, including LCD, CRT and plasma technologies, typically provide a maximum brightness of 500 cd/m$^2$ or less and a contrast ratio of between 100:1 and 1000:1. This is well below the capabilities of the human vision system. The overall luminance range of a human is approximately 14 orders of magnitude, varying from faint starlight ($10^{-6}$ cd/m2) to bright sunlight ($10^8$ cd/m2), and the luminance range viewable at any one instant in time is approximately five orders of magnitude. This describes a contrast ratio of approximately 100,000:1.

Figure 1:
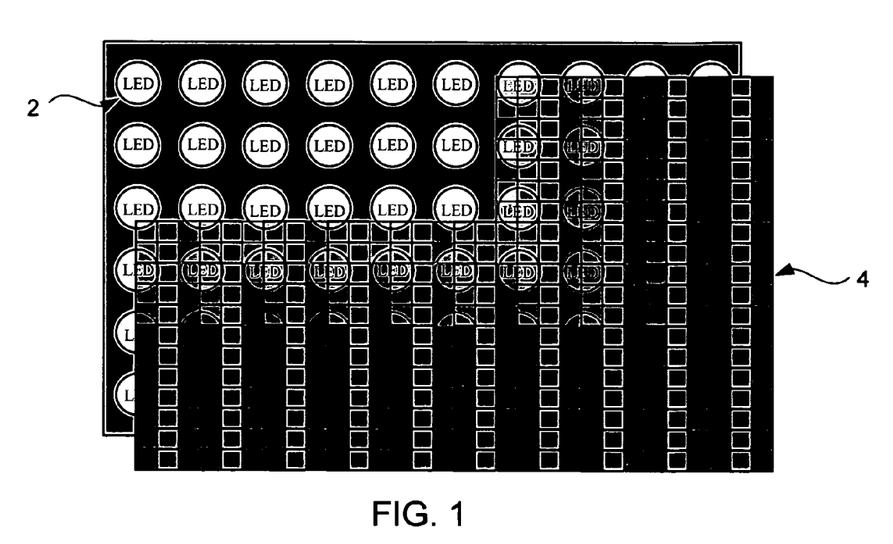
FIG. 1 is a diagram showing a high dynamic range LCD display.

LCD technology is well positioned to display HDR content. For example, HDR approaches may combine a high resolution LCD panel 4 with a spatially varying backlight 2. This configuration is shown graphically in FIG. 1. Some embodiments comprise internal processing that separates an HDR image sequence into components to drive the backlight 2 and front panel 4. The backlight signal may be of much lower resolution than the front panel due to properties of the human visual system.

Constructing an HDR LCD device may provide a significant improvement in dynamic range. For example, in some embodiments, a DLP projector may generate the backlight for the LCD panel. Some of these embodiments may produce a maximum brightness of 2,700 cd/m$^2$ and a dynamic range of 54,000:1. In other embodiments, a grid of LEDs may be employed for the backlight. In these embodiments, a maximum brightness of 8,500 cd/m$^2$ and a dynamic range of over 280,000:1 may be realized.

Currently, HDR content is scarce. However, the synthetic creation of HDR images from standard dynamic range (SDR) frames is possible. While this technique will provide additional content for HDR displays, the quality will generally not be as high as native HDR content. To further differentiate the HDR technology, content must be created, stored and transmitted.

Video Coding Embodiments

Backwards Compatibility

Visual quality can be a differentiating factor of a backwards compatible system. Two types of backwards compatibility may be identified. The first is a commercially backwards compatible system and the second is an operationally backwards compatible approach. Operational backwards compatibility simply requires that the SDR data is stored in a format understood by legacy devices. For example, utilizing the well known JPEG, MPEG, or ITU family of standards, or proprietary techniques i.e. Microsoft WMV, often leads to an operationally backwards compatible system. (Additional requirements may include the use of color space, gamma, profile and level parameters, maximum bit-rates, and bit-depths that are supported by legacy devices.) Commercial backwards compatibility requires a system to be operationally backwards compatible. However, in addition to ensuring that a legacy device can display the SDR video sequence, a commercially backwards compatible system must also guarantee that the quality of the SDR image data is visually acceptable.

While several previous approaches to HDR coding may be operationally backwards compatible, it is important to understand that current solutions are not commercially backwards compatible due to poor visual quality of the SDR image.

Embodiments of the present invention may efficiently compress HDR data while being commercially backwards compatible with legacy SDR devices. These embodiments may comprise a standards compliant video bit-stream for encoding the SDR data in conformance with any one of many existing SDR encoding standards, such as MPEG 2, H.264, etc., and a separate enhancement layer for the remaining HDR content. For both the SDR and HDR components, motion prediction may be utilized to exploit temporal redundancies in the video.

Figure 2:
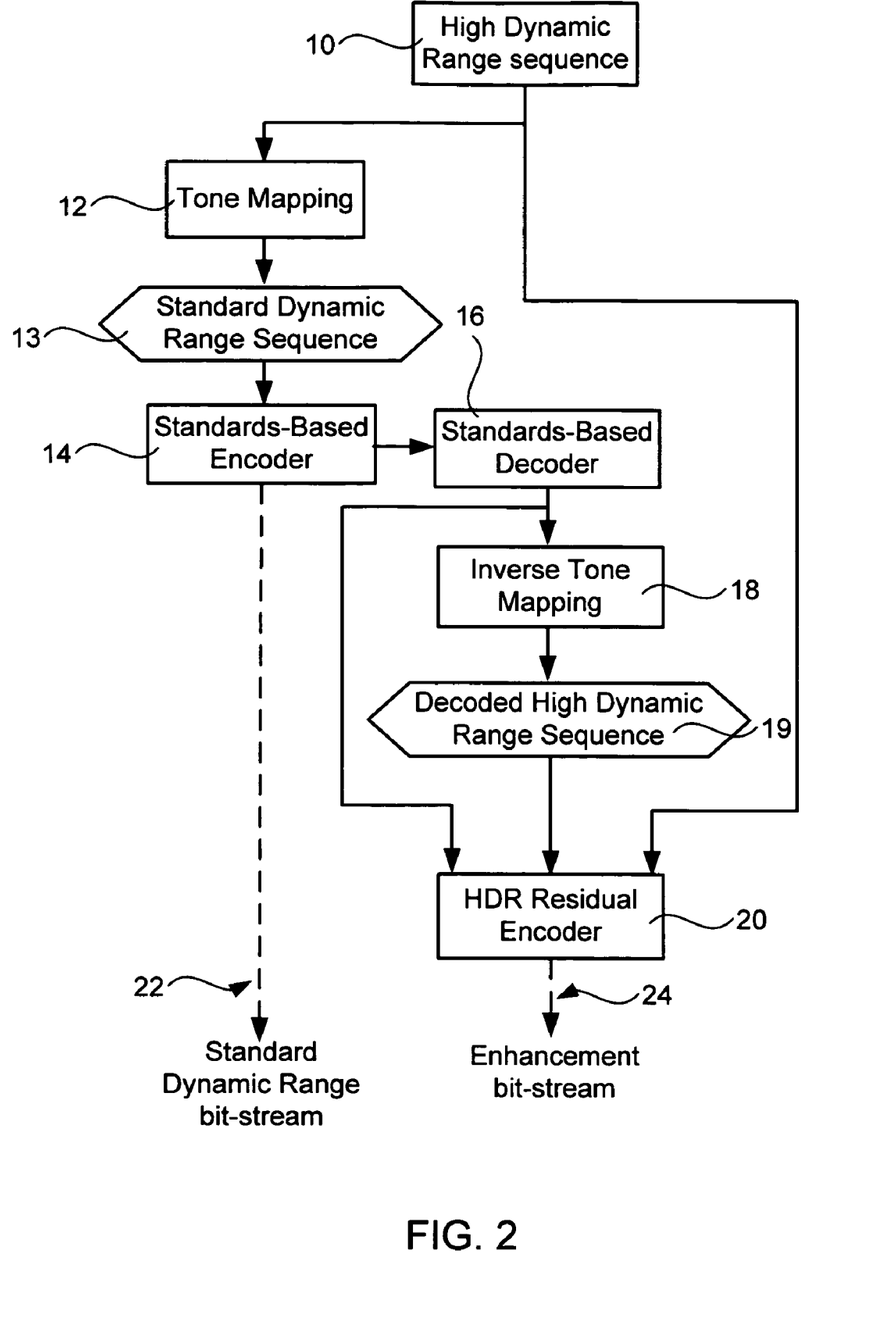
FIG. 2 is a diagram showing an exemplary embodiment of the present invention comprising a video encoder producing an HDR enhancement bitstream.

Some embodiments may be described with reference to FIG. 2. These embodiments may take an original HDR video sequence 10 as input. An SDR representation 13 of the HDR data 10 may then be generated by a tone mapping operation 12. This process may reduce the dynamic range and color gamut to match current SDR devices. The resulting SDR sequence 13 may then be compressed with a standards compliant video codec 14, 16. After compression, an estimate for the HDR data 19 may be generated by applying an inverse tone mapping procedure 18 to the compressed SDR sequence. The difference between the estimated 19 and original HDR data 10 may be calculated with an HDR residual encoder 20 and transmitted as an enhancement bit-stream 24, which may be multiplexed with the SDR information 22.

Figure 3:
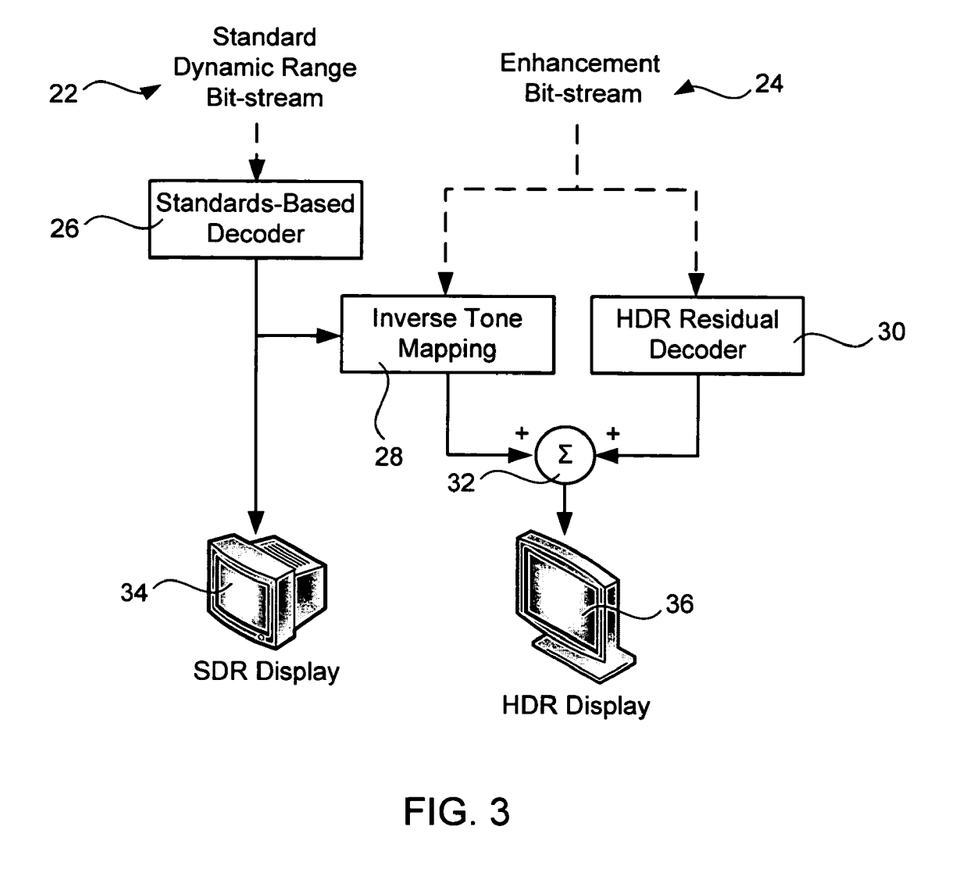
FIG. 3 is a diagram showing an exemplary embodiment of the present invention comprising a video decoder that processes an HDR enhancement bitstream.

Decoding the HDR data may be performed by reversing the encoding procedure. Embodiments comprising this process may be described with reference to FIG. 3. Here, the decoder may de-multiplex the bit-stream to extract the SDR 22 and enhancement layer 24 descriptions. The SDR image sequence may then be decoded with a standards-based decoder 26. For the case of a legacy SDR device, this completes the decoding process and the resulting image sequence may be provided for display on an SDR display 34. For the case of an HDR device, the decoded SDR image sequence may be inverse tone-mapped 28 and refined 32 with the HDR residual information produced by the HDR residual decoder 30. The result is the decoded HDR image sequence 36, which is displayed by the HDR device.

Figure 4:
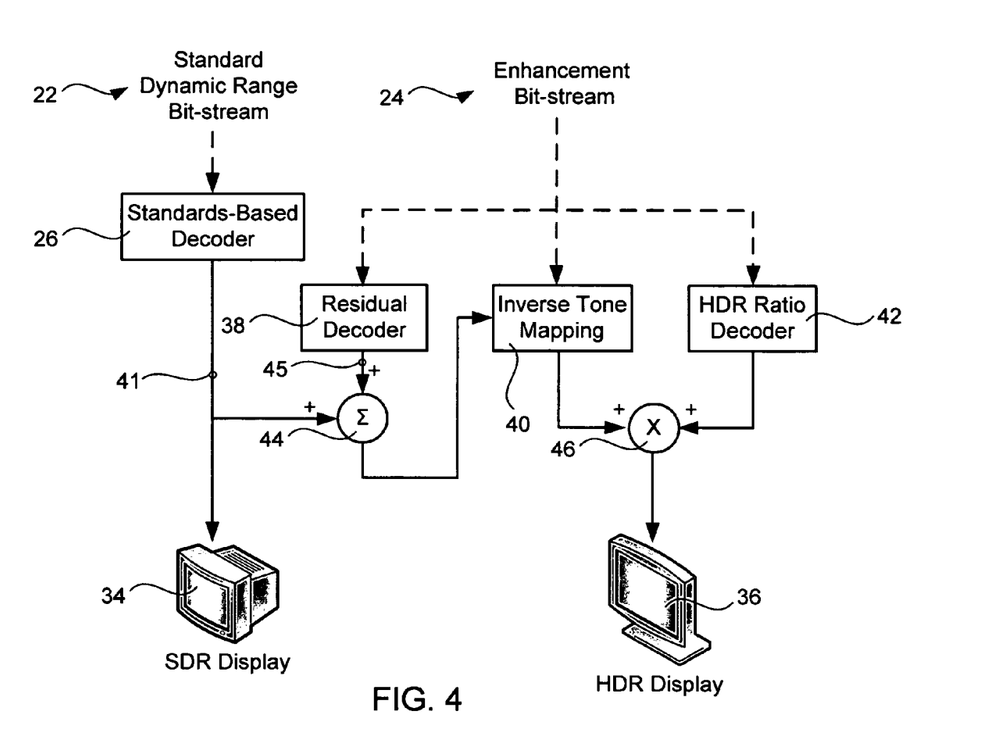
FIG. 4 is a diagram showing an exemplary embodiment of the present invention comprising a video decoder with an HDR ratio decoder.

Some alternative decoding embodiments may be described with reference to FIG. 4. In these embodiments, the SDR bitstream 22 may be received and decoded at a standards-based decoder 26. When the image is to be displayed on an SDR display 34, this SDR information 41 may be displayed directly. When the image is to be displayed on an HDR display 36, a residual signal 45 may be added to the SDR information 41 prior to inverse tone mapping 40. This residual signal 45 may be decoded from the enhancement bit-stream 24 with a residual decoder 38. After inverse tone-mapping 40, an additional residual signal may be applied 46. This second residual signal may be decoded from the enhancement bit-stream 24 with an HDR ratio decoder 42 and added to the output of the inverse tone mapping operation 40. Alternatively, the inverse tone mapping output may be multiplied 46 by the residual values.

Figure 5:
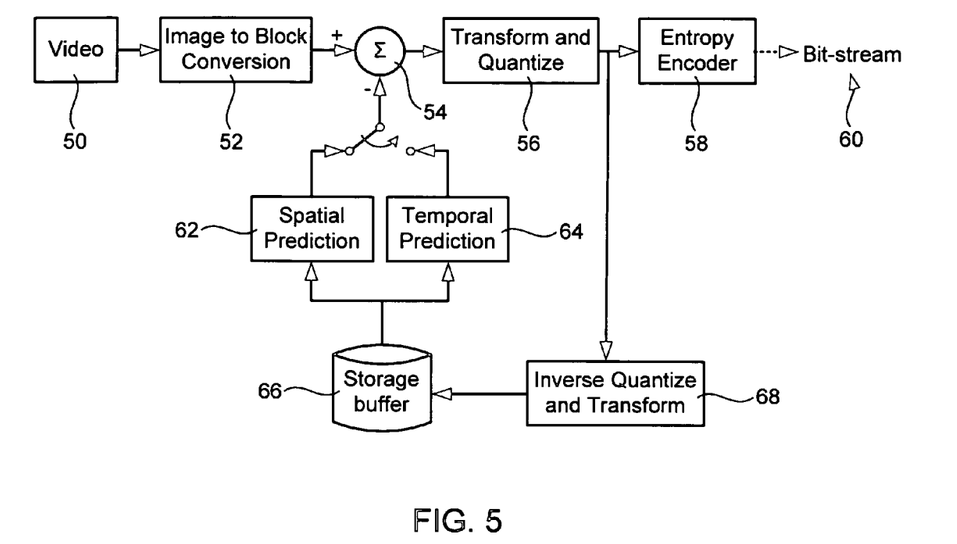
FIG. 5 is a diagram showing an exemplary standards-based video encoder.

In some embodiments of the present invention, compression of the SDR information may rely on standards based solutions. This facilitates decoding by legacy decoders. Some embodiments may employ a standard block-based encoder as shown in FIG. 5. In these embodiments, the codec decomposes 52 the SDR image sequence 50 into a sequence of blocks. Each block is predicted from neighboring pixel values through spatial prediction 62 or through the motion compensation of temporally adjacent frames, called temporal prediction 64. The difference between the prediction and original image values is calculated 54 and then de-correlated with a linear transform and quantized 56. Necessary information to predict and refine the image blocks is further encoded 58 and transmitted 60 to the decoder. The transformed and quantized 56 information may be inverse quantized and inverse transformed 68 and then stored in a buffer 66 for comparison with subsequently processed blocks.

Information transmitted in the enhancement layer may be used to describe the generation of the HDR image sequence. In some embodiments, processing may be divided into three components. The first is an inverse tone mapping operation that estimates the HDR sequence from the decoded SDR frames. This process may comprise color conversion, bit-depth extension, dynamic range expansion and gamma modification. The second is a residual coding tool that refines the HDR estimate with additional residual data. The third is a motion compensation tool that predicts residual data from temporally neighboring frames. These three process components are explained in more detail in the following sub-sections.

Inverse Tone Mapping

Figure 6:
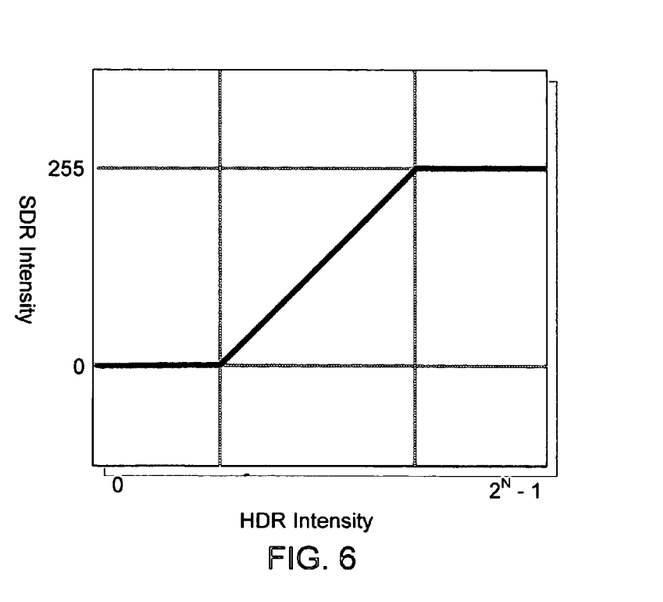
FIG. 6 is a diagram showing an HDR Intensity vs. SDR Intensity plot.

In some embodiments, tone mapping may describe the process of mapping an HDR image sequence to an SDR image sequence. As a simple example, this can be achieved by adding a fixed offset to the HDR data and clipping the result. This is equivalent to the input-output relation shown in FIG. 6. The goal of inverse tone mapping, in these embodiments, is to reverse the tone mapping process to generate an HDR estimate from the SDR data. Data uniquely mapped into the SDR gamut during tone mapping should be perfectly recovered by the inverse tone mapping procedure. The inverse tone mapping need not form a mathematical inverse but merely provide a good estimate of the HDR image from the SDR image. For instance, it is possible to add enhancement information, in a backward compatible way, alone to enable a decoder to accurately estimate an HDR sequence from an SDR sequence coded with a legacy codec. Additionally, when the spatial resolution of the SDR and HDR frames differ, the change in resolution may be accounted for in the inverse tone mapping procedure as well.

Practical tone mapping complicates the inverse tone mapping procedure. For example, utilizing the process in FIG. 6 leads to objectionable contouring artifacts. More acceptable results can be achieved with gradient domain or contrast based methods that preserve local image contrast. Alternatively, improved results can be realized by adapting the tone mapping operation to local properties of the image sequences. This may have the effect of adapting the mapping in both the spatial and temporal directions.

Flexibility in the inverse tone mapping procedure should allow for efficient compression without sacrificing SDR visual quality. In some embodiments, the enhancement bit-stream may comprise information to guide the inverse tone mapping procedure. The most basic component would be a global offset and scale parameter. This defines a linear relationship between the SDR and HDR data and can be implemented with a lookup table. In this approach, pixel values in the HDR sequence are equal to the scaled SDR pixel data plus the global offset.

In some embodiments, the inverse tone mapping procedure may be adapted as a downloadable lookup table. The downloadable table extends the linear mapping operation provided by the global offset and scale parameters and allows a more general inverse tone mapping procedure. To maximize the cost of sending this lookup table, the mapping data could be signaled differentially and coded relative to the global offset and scale parameters.

In some embodiments, inverse tone mapping may be implemented as block based switching. This is a more general configuration for the inverse tone mapping procedure. In this approach, an encoder defines multiple input-output relationships by either transmitting several look-up tables or multiple scale and offset parameters. The encoder then changes the inverse tone mapping process by signaling an index number in the bit-stream. The frequency of the switching may be application dependent. It may vary on a sequence basis, frame basis or even a block-by-block basis. Finer granularity could be achieved by interpolating the lookup tables within a block.

Residual Coding

In some embodiments, residual coding may describe the task of sending the difference between the original HDR data and the SDR sequence. This refines the estimate for the HDR sequence within the decoder and provides a mechanism for transmitting portions of the HDR sequence that are completely discarded by the tone mapping operation. In various embodiments, different tools for signaling the residual information may be used. These include domain mapping, masked transforms, block mode prediction and ratio coding. In addition, the residual coding can include a texture synthesizer driven by parameters in the bit-stream.

Domain mapping may be useful when the residual data contains positive and negative values. In some applications, these components signal small refinements to the output of the inverse tone mapping operations. However, in many HDR scenarios, the sign of the residual data may be correlated with the magnitude of the SDR image sequence. This occurs when the tone mapping employs some form of clipping to generate the SDR data. Positive values in the residual data then correspond to features brighter than the SDR gamut, while negative values in the residual correspond to features darker than the SDR gamut.

To exploit relationships between the residual and SDR frame, the domain mapping tool of some embodiments may allow blocks to be encoded in a number of ways. One approach is to code positive and negative values in the residual independently. This is the separable coding mode, and it effectively codes each block twice. In the first pass, the positive portion of the residual is signaled; in the second pass, the negative portion of the residual is transmitted. At the decoder, both blocks are decoded and added together to reconstruct the residual information.

Further domain mapping embodiments may also be used. One method is a magnitude only mode. This mode transmits the magnitude of the residual data but does not code the sign information. At the decoder, the sign information is determined by analyzing the reconstructed SDR frame. Another approach for domain mapping is to offset positive residual vales prior to encoding. This simplifies coding information that is smoothly varying throughout the extended dynamic range. A final method for domain mapping is to code the residual data without alternation.

In some embodiments a masked transform may be used as a tool for residual coding. These embodiments exploit the fact that residual values are small when the original HDR sequence is mapped uniquely within the SDR gamut. With traditional transform coding, any small residual values must be explicitly transmitted. The masked transform sends these values implicitly instead. This can be accomplished by masking the residual data at the decoder. The mask may be created from the decoded SDR frame, and it may adaptively attenuate the residual data on a pixel by pixel basis. Locations within the SDR gamut can be severely attenuated, while locations outside gamut are passed without alteration. This would allow the encoder to send non-negligible residual values for in-gamut locations when it results in compression efficiencies.

Some embodiments may comprise block mode prediction as a tool for residual coding. This tool may also exploit the fact that a unique mapping between the HDR and SDR pixel values results in small residual values. To account for this characteristic, each block in the residual data may be flagged as either present or not present. The flag does not necessarily need to be transmitted directly. In some embodiments, the flag may be predicted by analyzing the corresponding block in the reconstructed SDR frame. A flag in the bit-stream then denotes if the prediction is correct. The result is an increase in compression efficiency, as large regions of the residual signal can be skipped with minimal overhead.

In some embodiments, residual coding may be employed as a tool for residual coding. Ratio coding may encode a sequence of scale factors to be applied to the output of the inverse tone mapping process. These ratio factors can greatly increase the dynamic range of the image sequence, and the factors may have the important property of being spatially correlated. In some embodiments, ratio values may be coded at lower resolutions and/or with a form of differential coding. In these embodiments, bit-rate requirements of the ratio image are likely to be small.

Motion Compensation

Motion compensation predicts information in the current frame from HDR data in previously reconstructed data. This reduces the bit-rate requirements for video coding. Standards based approaches employ a combination of motion vectors and residual data for motion compensation. In these embodiments, several motion compensation processes are employed to complement standards based designs. This simplifies the coding of SDR data in a backwards compatible manner.

Figure 7:
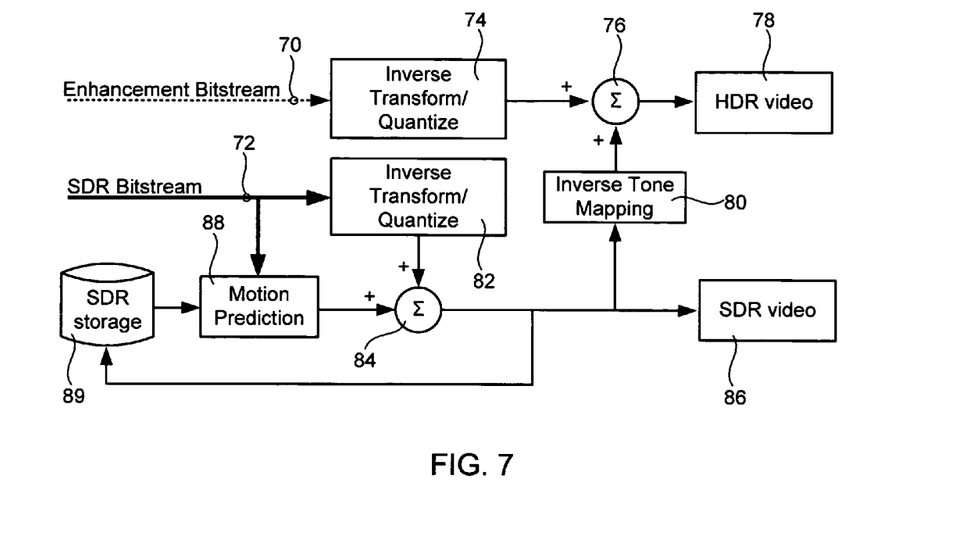
FIG. 7 is a diagram showing an exemplary embodiment of the present invention comprising a video decoder with motion prediction for the SDR bitstream.

In some embodiments of the present invention, motion compensation may be performed only on the SDR data. These embodiments may be described with reference to FIG. 7. In these embodiments, an SDR bitstream 72, may be received at the decoder. This SDR signal 72 may be "dequantized" and inverse transformed 82. Elements of the bitstream 72 may be used for motion prediction 88. Motion prediction 88 data may be added 84 to the dequantized and inverse transformed residual data to form SDR video data 86. This SDR video data 86 may also be inverse tone mapped 80 and combined 76 with dequantized and inverse transformed 74 data from the enhancement bitstream 70. Once combined 76, this data represents the HDR video data 78. As seen in FIG. 7, motion vectors from the SDR bit-stream 72 may be used to predict 88 the SDR data. Residual information from the SDR 72 and enhancement bit-stream 70 are then added 76, 84 to the prediction. In these embodiments, memory requirements for the decoder may be reduced by utilizing previously decoded HDR frames for reference instead. This may be accomplished by applying an inverse tone mapping operation prior to motion compensation. The mapping operation may be modified to approximate the original tone mapping process.

Figure 8:
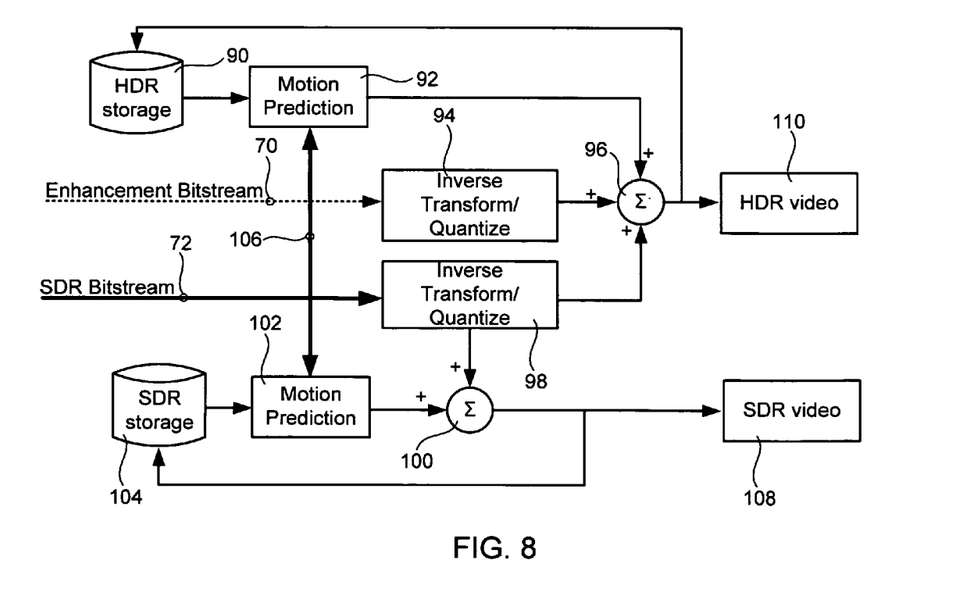
FIG. 8 is a diagram showing an exemplary embodiment of the present invention comprising a video decoder with motion prediction for both the SDR bitstream and the HDR bitstream.

Alternative embodiments for motion compensation may alter previous HDR frames. Some exemplary embodiments are depicted in FIG. 8. In these embodiments, the motion vectors 106 from the SDR bit-stream 72 may be applied directly to the HDR reference frames. Residual information may also be transmitted in the enhancement layer. In these exemplary embodiments, the SDR residual may be added to the predicted block prior to any residual in the enhancement stream.

In these embodiments, an SDR bitstream 72 may be dequantized and inverse transformed 98. Motion vector data and other motion prediction data may be extracted and used for motion prediction 102 of the SDR data. This prediction data may be combined 100 with the dequantized and inverse transformed SDR data to form SDR video data 108. The dequantized and inverse transformed SDR residual data may also be combined with dequantized and inverse transformed 94 enhancement bitstream data and with enhancement prediction 92 data to form HDR video data 110. SDR storage 104 and HDR storage 90 may be used to store previous frame, block or other data for prediction of subsequent data.

Figure 9:
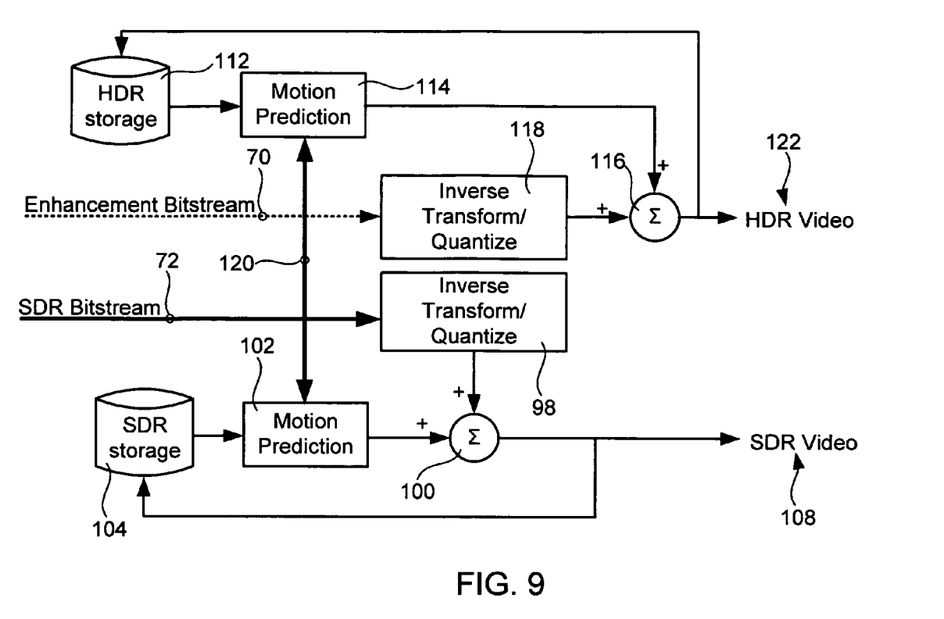
FIG. 9 is a diagram showing an exemplary embodiment of the present invention comprising a video decoder with SDR data in the enhancement bitstream.

Further exemplary embodiments are depicted in FIG. 9. In these embodiments, motion vectors from the SDR bit-stream may be applied directly to the HDR reference frames. Residual information may also be transmitted in the enhancement layer. The exemplary embodiments shown in FIG. 9 only add the enhancement layer residual to the predicted HDR data.

In these embodiments, the SDR bitstream data is dequantized and inverse transformed 98. Motion vector data and/or other prediction data 120 may be extracted from the SDR bitstream 72 and used for SDR motion prediction 102 and HDR motion prediction 114. These prediction processed may access previous data stored in SDR storage 104 and HDR storage 112. SDR motion prediction data may be combined 100 with the dequantized and inverse transformed SDR data to form SDR video data 108. The enhancement bitstream 70 may also be dequantized and inverse transformed 118 and combined 116 with HDR motion prediction data to form HDR video data 122.

Motion compensation may change the structure and statistics of the enhancement layer residual. For example, in the embodiments illustrated in FIG. 9, the enhancement layer residual contains both SDR and HDR components. This changes the likelihood that a particular residual coding tool is employed. To account for interactions between tools, some embodiments may employ an adaptive signaling scheme to selectively enable and disable coding processes.

Applications

Some embodiments of the present invention comprise a digital camcorder. In these embodiments, video content may be acquired from an HDR sensor or multiple SDR sensors. Once acquired, the data may be stored on tape, optical media or solid state memory. The proposed system stores the HDR video efficiently and does not sacrifice the quality of the SDR sequence. The image sequence is still viewable on an SDR display, and it may be processed by legacy editing or post-processing techniques without conversion. In addition, the sequence may be viewed on an HDR display and processed by "HDR-aware" editing and post-processing applications. Differentiating features of these "HDR-aware" applications include improved exposure and white balance correction as well as realistic effects such as blur and motion.

Some embodiments of the present invention comprise a personal video recorder. In these embodiments, video content may be broadcast and recorded by a personal video recorder. Transmitting HDR content with these embodiments allows both legacy and "HDR-aware" recorders to time-shift the video content. Legacy devices only display the SDR image sequence, while "HDR-aware" devices display the expanded dynamic range. The "HDR-aware" device may also employ systems and methods for synthesizing the expanded dynamic range from an SDR video sequence. This benefits both HDR devices as well as legacy devices with relatively large contrast ratios. Two exemplary configurations for the synthesizing operation may be implemented. In a time critical environment, an embodiment may explicitly generate the HDR content. In a less constrained scenario, more sophisticated synthesis operations may be employed in an off-line manner, and the result may be efficiently stored.

Some embodiments of the present invention may comprise a home media gateway. In these embodiments, video content may be received by a home media gateway and distributed to devices throughout the network. Content transmitted with these embodiments may allow simple rate adaptation within the home media gateway. HDR content may only be sent when supported by both the channel and device.

Some embodiments of the present invention may comprise an optical media player. In these embodiments, video content may be distributed on optical media. These embodiments may allow HDR content to be included on an optical disc or other media while maintaining compliance. Legacy optical devices may ignore the additional information and produce SDR video sequences. "HDR-aware" devices decode the entire HDR video sequence and provide it for display. The "HDR-aware" device can also synthesize the expanded dynamic range from SDR media. Embodiments comprising an "HDR-aware" optical media player enable the expanded dynamic range already captured on film and from computer special effects to be easily distributed to the consumer. These embodiments may provide an additional value-added feature for the optical media and may also provide a large source of high dynamic range content for display.

Some embodiments of the present invention may comprise a high dynamic range LCD television. In these embodiments, video content may be received by the television in compressed form and displayed with extended dynamic range.

Some of these embodiments may add a method to efficiently transmit HDR content to the television. Content may be stored on an HDR camcorder, personal video recorder or optical media. It may also be received from a home media gateway or synthesized.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for transmitting encoded video data, said method comprising:
   a) receiving a high dynamic range (HDR) image sequence;
   b) tone mapping a standard dynamic range (SDR) image sequence from said received HDR image sequence;
   c) encoding said mapped SDR image sequence with an SDR encoder;
   d) transmitting said encoded SDR image sequence to a recipient;
   e) decoding said encoded SDR image sequence;
   f) inverse tone mapping the decoded SDR image sequence to form decoded HDR sequence data;
   g) encoding said decoded SDR image sequence, said decoded HDR sequence data and said received HDR image sequence to form HDR residual data, said HDR residual data being the difference between said decoded HDR sequence data and said received HDR image sequence; and
   h) transmitting said HDR residual data to said recipient.

2. The method of claim 1 further comprising storing said encoded SDR image sequence and said HDR residual data on a storage device.

3. The method of claim 1 wherein said SDR encoder is an MPEG-2 encoder.

4. The method of claim 1 wherein said SDR encoder is an H.264 encoder.

5. The method of claim 1 wherein transmitting said encoded SDR image sequence and transmitting said HDR residual data are multiplexed in a single transmission.

6. The method of claim 1 wherein said encoded SDR image sequence is decoded independently of said HDR residual data.

7. A video codec, said codec comprising:
   a) a receiver for receiving a high dynamic range (HDR) image sequence;
   b) a standard dynamic range (SDR) tone mapper for mapping a standard dynamic range (SDR) image sequence from said received HDR image sequence;
   c) an SDR encoder for encoding said mapped SDR image sequence;
   d) a decoder for decoding said encoded SDR image sequence;
   e) an inverse tone mapper for converting said decoded SDR image sequence into a decoded HDR sequence;
   f) an HDR residual encoder for combining the decoded SDR image sequence, said decoded HDR sequence and said received HDR image sequence to form HDR residual data, said HDR residual data being the difference between said decoded HDR sequence and said received HDR image sequence; and
   g) a transmitter for transmitting said encoded SDR image sequence and said HDR residual data to a destination.

* * * * *